Jan. 5, 1943.  W. W. HASTINGS  2,307,504
TEMPERATURE RESPONSIVE INSTRUMENT
Filed May 15, 1941
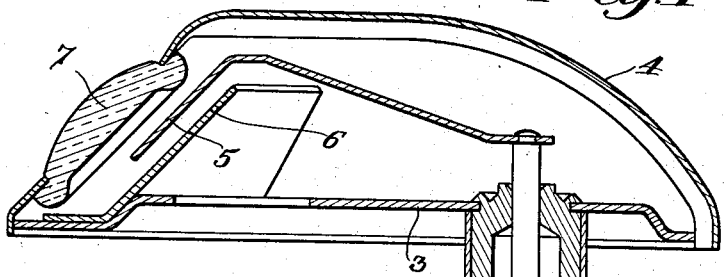
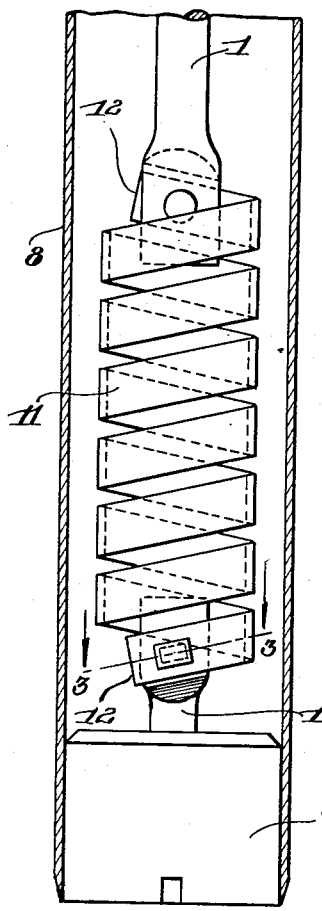
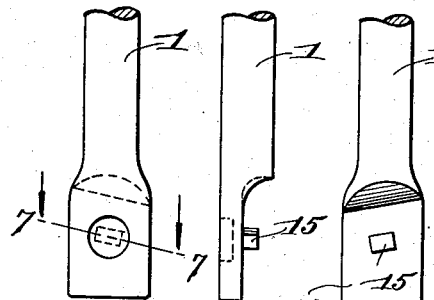
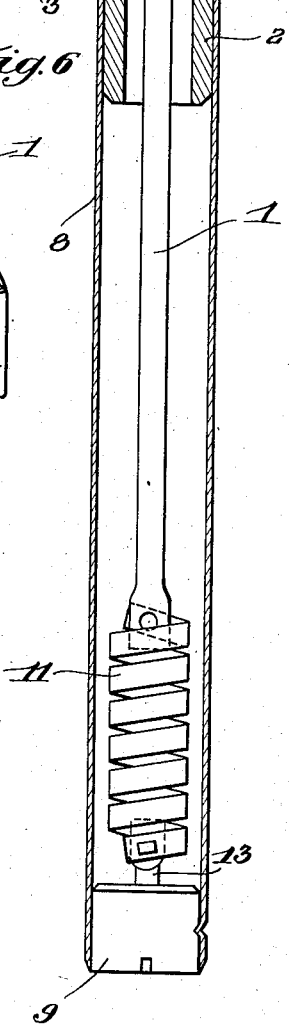
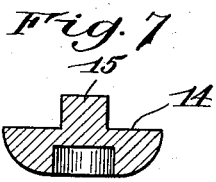
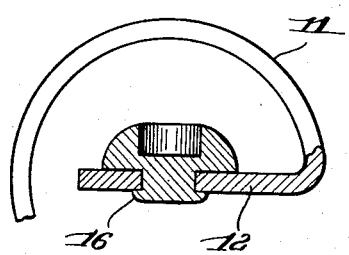
INVENTOR.
Warren W. Hastings
BY Harold E. Stonebraker
his ATTORNEY.

Patented Jan. 5, 1943

2,307,504

UNITED STATES PATENT OFFICE 2,307,504

TEMPERATURE RESPONSIVE INSTRUMENT

Warren W. Hastings, Brighton, N. Y., assignor to Rochester Manufacturing Co., Inc., Rochester, N. Y., a corporation of New York Application May 15, 1941, Serial No. 393,651

3 Claims. (Cl. 297—16)

This invention relates to a temperature responsive instrument, with more particular reference to thermometers and similar structures employing a bimetallic coil connected to a movable part such as an indicator shaft to be actuated in accordance with temperature changes affecting the bimetallic coil, and it has for its principal object to afford efficient means for accurately and securely fastening the ends of the bimetallic coil so that its proper functioning is assured.

In structures of this character, the opposite ends of the bimetallic coil are usually attached to a stationary support and to a rotatable shaft, and it is a more particular purpose of the invention to afford efficient and improved means for securing the ends of the bimetallic coil to these parts in such fashion as to insure a true coaxial relationship between the stationary support, the rotatable shaft, and the bimetallic coil.

Another purpose of the invention is to afford a construction that enables using a rotatable shaft and stationary support of considerably smaller cross-section or diameter than the inside diameter of the bimetallic coil, avoiding the necessity of an attaching hub or portion located inside the coil and of but slightly less diameter than the coil as in many prior structures, while at the same time insuring a rigid permanent interlocking connection between the ends of the coil and the parts to which they are secured.

A further purpose of the invention is to provide an arrangement in which a bimetallic coil can be easily assembled and accurately attached to the rotatable shaft and stationary support by means of interlocking fastening instrumentalities that serve to position the coil in a true coaxial relation to the rotatable shaft and the stationary support.

In some thermometer structures employing a bimetallic coil, it is surrounded by a tube in close proximity thereto to avoid heat losses and to transmit heat readily from around the tube to the bimetallic coil, thus necessitating the use of a coil that contracts upon an increase in temperature, and it is an additional object of the invention to facilitate the use of such a structure by eliminating the necessity of hubs in close proximity to the inside surface of the coil, on which the coil is likely to rub when contracting and thus interfere with the accurate functioning of the device, the present structure being designed to fasten the ends of the bimetallic coil to parts which are considerably smaller in cross-section or diameter than the inside diameter of the bimetallic coil so that there is no opportunity for rubbing of the latter upon contraction.

Still an additional purpose of the invention is to fasten the ends of the bimetallic coil by positive interlocking means and without cutting a slot in the end of the rotatable shaft, thus enabling the use of a shaft of small diameter and thereby increasing the strength and accuracy of the instrument.

To these and other ends, the invention consists in the construction and arrangement of parts that will appear clearly from the following description when read in conjunction with the accompanying drawing, the novel features being pointed out in the claims following the specification.

In the drawing:

Fig. 1 is a sectional view of a thermometer construction showing the application of a preferred embodiment of the invention;

Fig. 2 is an enlarged view partially broken away and in section, showing the connections between the ends of the bimetallic coil, the rotatable shaft, and the stationary support;

Fig. 3 is a horizontal sectional view on the line 3—3 of Fig. 2 looking in the direction indicated;

Fig. 4 is a plan view, partially broken away, showing the extremity of the rotatable shaft that is attached to the adjacent end of the bimetallic coil;

Fig. 5 is a view in side elevation of the same showing the fastening lug;

Fig. 6 is a plan view looking at the side of the shaft opposite to that shown in Fig. 4, and showing the fastening lug, and Fig. 7 is a detail sectional view on the line 7—7 of Fig. 4.

The structure forming the subject matter of the invention is adaptable to any instrument where a bimetallic coil controls a movable part such as an indicator shaft upon changes in temperature, the structure herein disclosed constituting one commercial application of the invention to a bimetallic thermometer in which a rotatable shaft 1 is mounted in a suitable bearing 2 secured in a housing that includes a supporting plate 3 and a cover 4, while 5 is a pointer or indicator affixed to the end of the indicator shaft 1 and movable over the dial 6 that is readable through the window 7 in the housing.

Attached to the bearing or hub 2 is a tube 8 which can be located in close proximity surrounding the bimetallic coil to be described presently, and is provided at its end with a plug 9 fixedly secured therein in any suitable fashion and constituting the stationary support to which one end of the bimetallic coil is connected while its opposite end is secured to the rotatable shaft 1.

The bimetallic coil is designated at 11, being formed of flat material and constructed so as to contract upon an increase in temperature, as usual in this type of construction, so that the outer surface of the coil can be located closely to the surrounding tube 8 without danger of contacting the same upon a change in temperature. At each end, the bimetallic coil 11 is provided with an end or fastening portion 12, see Fig. 3, that is arranged radially of the coil as shown in Fig. 3, and also extends parallel to the adjacent convolution, as shown in Figs. 1 and 2, and 13 designates a post on the stationary support 9 to which the outer end of the bimetallic coil is connected while its inner end is fastened to the rotatable shaft 1 in a manner that will now be described.

The two ends of the bimetallic coil are similarly constructed, the rotatable shaft 1 and post 13 being provided with similarly formed extremities so that it will be necessary to describe only one of these, it being understood that the structure is the same at both ends of the bimetallic coil. In order to eliminate the use of a large hub within and close to the inner surface of the coil, the rotatable shaft 1 is made from stock that is considerably smaller in diameter or cross-section than the inside diameter of the bimetallic coil 11, and it is essential that the coil be securely and permanently fastened at its ends to the shaft 1 and post 13, also that the bimetallic coil and shaft 1 be accurately located in coaxial relationship.

To accomplish this, the shaft 1 is swaged at its end to afford a wide extremity of reduced thickness having a flattened surface 14, and at the same time said flattened surface 14 is upset to afford an extruded lug 15 of rectangular or other suitable shape, the lug 15 being located in a predetermined angular relationship to the longitudinal axis of the shaft 1.

The end portion 12 of the bimetallic coil has an opening punched therein to receive the lug 15, said opening being of the same shape as the lug 15 to afford an interlocking relationship when placed over the lug, and the opening in the coil is located in the same angular relationship to the longitudinal axis of the coil as the lug 15 so that when the coil is assembled with its openings in engagement with the lugs 15, there is assured a true and accurate coaxial relation between the rotatable shaft 1, post 13 or stationary support, and the bimetallic coil 11.

After the end portion of the bimetallic coil is located over the lug 15, it is fastened by swaging the lug 15 over the outer surface of the end portion of the coil, as indicated at 16 in Fig. 3. The flattened surface 14 is offset from the longitudinal axis of the shaft a distance equal to half the thickness of the metal of the coil so that when the end portion of the coil is secured thereon, in abutting relationship, the longitudinal axis of the shaft passes through a point equidistant from the opposite surfaces of the end portion of the coil so that the coil and rotatable shaft are coaxially located.

With this construction, the ends of the bimetallic coil are rigidly and permanently fastened in the desired predetermined relationship, and the coil can be readily assembled by positioning the preformed openings in its end portions over the preformed integral fastening lugs on the shaft and stationary support, which are then swaged over the outer surfaces of the end portions of the coil. The similar angular relationship of each fastening lug and its corresponding opening in the coil, as well as the interlocking relation between these parts, assures accurate alinement of the bimetallic coil coaxially with the longitudinal axis of the shaft.

It will be observed that there is no opportunity for the bimetallic coil to rub or contact slidably with any hub or other portion located interiorly a shaft of small diameter can be used, and a rigid, permanent, and durable fastening is had between the shaft and the coil, enabling a more efficient and more accurate coil than has been possible with assemblies such as have heretofore characterized instruments in this field.

While the invention has been described with reference to a detailed embodiment, it is not confined to the particular construction shown, and this application is intended to cover such modifications and changes as may come within the purposes of the improvement or the scope of the following claims.

I claim:

1. In a temperature responsive instrument, the combination with a stationary support and a rotary shaft of substantially the same cross-sectional area throughout its length, of a bimetallic helical coil having end portions that extend inwardly and transversely of the coil intersecting the longitudinal axes of said shaft, stationary support, and coil respectively, the shaft and stationary support having extremities that are located within the coil and are considerably smaller in cross-section than the inside diameter of the coil, said extremities including flattened surfaces which are parallel to and offset radially from the longitudinal axes of the shaft and stationary support respectively a distance equal to one-half the thickness of the metal of the coil and which engage the inner surfaces of said end portions of the coil, the longitudinal axis of the coil thereby coinciding with the longitudinal axes of the shaft and stationary support respectively, and integral fastening means carried by said extremities, said fastening means extending through openings in the end portions of the coil and overlying the outer surfaces of the latter.

2. In a temperature responsive instrument, the combination with a stationary support and a rotary shaft of substantially the same cross-sectional area throughout its length, of a bimetallic helical coil having end portions that extend inwardly and transversely of the coil intersecting the longitudinal axes of said shaft, stationary support, and coil respectively, the shaft and stationary support having extremities that are located within the coil and are considerably smaller in cross-section than the inside diameter of the coil, said extremities including flattened surfaces which are parallel to and offset radially from the longitudinal axes of the shaft and stationary support respectively a distance equal to half the thickness of the metal of the coil and which engage the inner surfaces of said end portions of the coil, said extremities having integral fastening lugs of angular cross-section which extend through and interlockingly engage correspondingly shaped angular openings in the end portions of the coil and overlie the outer surfaces of the latter, the longitudinal axis of the coil coinciding with the longitudinal axes of the shaft and stationary support respectively.

3. In a temperature responsive instrument, the combination with a stationary support and a rotary shaft of substantially the same cross-sectional area throughout its length, of a bimetallic helical coil having end portions that extend inwardly and transversely of the coil intersecting the longitudinal axes of said shaft, stationary support, and coil respectively, said end portions of the coil being parallel to the adjacent convolutions and conforming to the helical angle of the coil, the shaft and stationary support having extremities that are located within the coil and are considerably smaller in cross-section than the inside diameter of the coil, said extremities including flattened surfaces which are parallel to and offset radially from the longitudinal axes of the shaft and stationary support respectively a distance equal to one-half the thickness of the metal of the coil and which engage the inner surfaces of said end portions of the coil, said extremities having integral rectangular fastening lugs arranged at an angle to the longitudinal axes of the shaft and support corresponding to the helical angle of the coil, said lugs interlockingly engaging rectangular openings arranged in the end portions of the coil parallel to the side edges of said end portions and the lugs overlying the outer surfaces of said end portions, the longitudinal axis of the coil coinciding with the longitudinal axes of the shaft and support respectively.

WARREN W. HASTINGS.